United States Patent
Frenkel et al.

(10) Patent No.: US 7,629,412 B2
(45) Date of Patent: Dec. 8, 2009

(54) RIGID PVC BLEND COMPOSITION

(75) Inventors: Peter Frenkel, Danbury, CT (US); Perry M. Reed, Matawan, NJ (US); Larry Fiedler, Prospect, CT (US)

(73) Assignee: Chemtura Corporation, Middlebury, CT (US)

( * ) Notice: Subject to any disclaimer, the term of this patent is extended or adjusted under 35 U.S.C. 154(b) by 604 days.

(21) Appl. No.: 11/450,676

(22) Filed: Jun. 8, 2006

(65) Prior Publication Data

US 2007/0287782 A1 Dec. 13, 2007

(51) Int. Cl.
*C08L 27/06* (2006.01)
*C08K 5/09* (2006.01)

(52) U.S. Cl. .................. 524/567; 524/413; 524/434; 524/527; 524/528; 525/239; 525/240

(58) Field of Classification Search .......... 525/239, 525/240; 545/527, 528; 524/413, 434, 567, 524/527, 528
See application file for complete search history.

(56) References Cited

U.S. PATENT DOCUMENTS

| 3,819,592 A | 6/1974 | Visser et al. |
| 3,819,852 A | 6/1974 | Wolf |
| 3,896,094 A | 7/1975 | Visser et al. |
| 3,896,096 A | 7/1975 | Visser et al. |
| 4,668,834 A | 5/1987 | Rim et al. |
| 4,767,817 A * | 8/1988 | Lee ..................... 524/494 |
| 4,940,747 A * | 7/1990 | Eichenauer et al. ......... 524/504 |
| 4,956,122 A | 9/1990 | Watts et al. |
| 4,960,829 A | 10/1990 | Allen et al. |
| 5,527,951 A | 6/1996 | Khan et al. |
| 5,786,504 A | 7/1998 | Nudenberg et al. |
| 6,232,375 B1 * | 5/2001 | Wehner et al. ............... 524/98 |
| 6,531,533 B1 | 3/2003 | Kuhn et al. |
| 2003/0114322 A1 | 6/2003 | Richter et al. |
| 2004/0242739 A1 * | 12/2004 | Daute et al. ................. 524/157 |

FOREIGN PATENT DOCUMENTS

| BE | 809104 | 6/1974 |
| EP | 0182470 | 5/1986 |

* cited by examiner

*Primary Examiner*—Kelechi C Egwim
(74) *Attorney, Agent, or Firm*—Jaimes Sher

(57) ABSTRACT

A composition is disclosed that comprises rigid PVC and from about 0.1 to about 10 phr of an EPM copolymer. The compositions optionally also include one or several additives selected from lubricants, impact modifiers, process aids, fusion promoters, heat stabilizers, co-stabilizers, fillers, pigments, antioxidants, UV absorbers, antistats, metal release agents, and plasticizers. The EPM is particularly useful as a PVC gloss reducing agent and additive enhancing agent for such polymer additives, particularly lubricants, heat stabilizers, UV absorbers, and pigments.

8 Claims, No Drawings

RIGID PVC BLEND COMPOSITION

BACKGROUND OF THE INVENTION

1. Field of the Invention

The present invention relates to rigid PVC formulations containing ethylene-propylene copolymers. More particularly, the present invention relates to the use of ethylene-propylene copolymers to reduce gloss and improve PVC characteristics, such as heat and UV stability, lubricity, and coloration.

2. Description of Related Art

An overview of the lubricants used in plastics and their functions in plastics processing is given in R. GACHER AND H. MULLER, PLASTICS ADDITIVES HANDBOOK, (4th ed. 1993), and HANS ZWEIFEL, PLASTICS ADDITIVES HANDBOOK (5th ed. 2001). Their functions include improving the compound flow by reducing internal friction and preventing adhesion of polymer melts to hot machine parts (release effect). Lubrication affects the heat stability of PVC. Traditional lubricants are obtained using conventional vanadium/aluminum Ziegler catalysts and include polyolefin waxes, such as ethylene homopolymers and its copolymers with propylene or α-olefins.

There are several patents relating to processes and, more specifically, catalysts for manufacturing liquid ethylene-α-olefin copolymers and, more specifically, ethylene-propylene co-polymers (EPM), optionally containing a non-conjugated diene. Examples include U.S. Pat. Nos. 3,896,094, 3,896,096, 4,668,834, 4,956,122, 4,960,829, 5,527,951, and 5,786,504. Typically, such catalyst compositions include:

(a) a vanadium-containing compound, a catalyst;
(b) an organoaluminum compound, a co-catalyst; and
(c) a catalyst activator/promoter.

The presence of the catalyst activator/promoter differentiates this tri-component catalyst system from the conventional vanadium/aluminum Ziegler catalysts used, for example, for making standard polyethylene waxes and allows producing ethylene-propylene copolymers in a liquid form.

U.S. Pat. No. 3,896,094 discloses that vanadium phosphorodithioates, represented by a specified formula, are effective catalysts in the preparation of copolymers of alpha-olefins, e.g., ethylene/propylene rubber (EPR), and the terpolymers of the alpha-olefins with the nonconjugated dienes, e.g., ethylene/propylene/diene terpolymers (EPDM rubber), when an alkyl aluminum is used as a cocatalyst. These catalyst systems are said to be very efficient and can be modified with a zinc compound to give liquid elastomers.

U.S. Pat. No. 3,896,096 discloses that in the copolymerization of alpha-olefins, especially the copolymerization of ethylene and propylene (with a diene if desired), using a coordination type catalyst based on a vanadium salt and an alkylaluminum halide, the molecular weight of the polymer can be regulated, and the activity of the catalyst can be enhanced, by adding disulfides of a defined type.

U.S. Pat. No. 4,668,834 discloses that low molecular weight copolymers comprised of ethylene, an alpha-olefin and (optionally) a nonconjugated polyene, which copolymers have a viscosity index of at least about 75 and vinylidene-type unsaturation, possess unexpected advantages as intermediates in epoxy-grafted electrical encapsulation compositions.

U.S. Pat. No. 4,956,122 discloses a lubricating composition containing: a high viscosity synthetic hydrocarbon such as high viscosity poly(alpha-olefins), liquid hydrogenated polyisoprenes or ethylene-alpha-olefin copolymers having a viscosity of 40 to 1000 centistokes at 100° C.; a low viscosity synthetic hydrocarbon and/or optionally a low viscosity ester; and optionally an additive package to impart desirable performance properties to the composition.

U.S. Pat. No. 4,960,829 discloses that blends comprised of (a) a high molecular weight elastomeric polymer; (b) a sufficient amount of an ethylene/alpha-olefin/nonconjugated polyene terpolymer having a number average molecular weight of between about 1,000 and about 15,000 such that the variety of the blend is at least about 5 percent lower than the viscosity of component (a) alone, and (c) a curative, exhibit increased processability and, when cured, exhibit unexpectedly desirable tensile strength, ozone resistance, and oil resistance.

U.S. Pat. No. 5,527,951 discloses that tert-alkylmethoxy-substituted vanadium compounds are useful as catalysts for the polymerization of ethylene or the copolymerization of ethylene with alpha-olefins and (optionally) nonconjugated polyenes.

U.S. Pat. No. 5,786,504 discloses compounds of a specified formula that by themselves and in combination with certain halo-but-2-enoic acids and esters are useful as catalyst promoters in ethylene polymerization processes.

U.S. Published Patent Application 2003/0114322A1 discloses the use of polyolefin waxes as external lubricants and release agents for plastics. The polyolefin waxes are produced by using metallocene catalysts, whereby the polyolefin waxes are homopolymerizates of ethylene or are copolymerizates of ethylene with one or more 1-olefins, and linear or branched, substituted or non-substituted olefins having 3-18 C atoms are used as 1-olefins. The processable plastic mixtures produced in this manner are said to have a distinctively longer tack-free time and exhibit an improved behavior with regard to mold release.

Belgian Patent No. 809104 relates to a pipe composition of reduced cracking and increased toughness that was obtained via graft copolymerization from 95 parts vinyl chloride monomer and five parts rubbery ethylene-propylene copolymer.

Chinese Patent No. 1475339 relates to a tubing core composition containing 100 parts PVC and 10-40 parts of ethylene-propylene rubber as an impact modifier.

European Patent Application 0182470 relates to low molecular weight, liquid EPDM (ethylene-propylene terpolymers containing non-conjugated dienes) compositions suitable for weatherable coatings based on asphalt, polyurethanes, and solid EPDM. The compositions are comprised of a copolymer of ethylene and a monomer having the formula $CH_2CHR$, where R is $C_1$-$C_{10}$ linear or branched alkyl (propylene is preferred), and optionally containing a non-conjugated diene, such as 1,4-hexanedione; said polymer having a molecular weight of 500-20,000. The ethylene to propylene (E/P) ratio is from 85:15 to 25:75, with the preferred ratios being 60:40 to 40:60. The non-conjugated diene in the EPDM is present in a range of from 0 to 25 percent, with a preferred range of 5 to 13 percent. The compositions include a reinforcing agent, a curative (such as organic peroxides) to convert double bonds of EPDM into the cured, fully saturated and weatherable polymer, and a small amount of a solvent. The compositions contain conventional adjuvants: antioxidants, antiozonates, ultraviolet stabilizers, tackifiers, lubricants, pigments, fillers, flame retardants, and the like. The preparation of the preferred EPDM materials is described in U.S. Pat. Nos. 3,819,592, 3,819,852, 3,896,094, and 3,896,096.

Truly rigid formulations containing less than 10 phr (parts of the liquid EPM per 100 parts PVC resin) and applications for such formulations are believed to be new in the art and heretofore undisclosed.

SUMMARY OF THE INVENTION

Liquid ethylene-propylene copolymers (EPM), prepared using a tri-component ("modified" Ziegler-type catalyst) system as described in U.S. Pat. No. 5,786,504, were used in rigid PVC formulations at less than 10 phr loadings. Contrary to the waxes obtained using conventional Ziegler catalysts, it was discovered that the EPM produced with the use of these tri-component catalysts provided excellent processing and performance characteristics to the PVC formulations, allowing efficient lubrication, reduced gloss and improved metal release, as well as effective protection of the PVC compound against heat and UV light.

More particularly, the present invention is directed to a composition comprising rigid PVC and from about 0.1 to about 10 phr, preferably about 2 to about 4 phr, of an EPM copolymer.

In a preferred embodiment, the rigid PVC/EPM copolymer composition further comprises at least one additive selected from the group consisting of lubricants, impact modifiers, process aids, fusion promoters, metal release agents, heat stabilizers, co-stabilizers, fillers, pigments, antioxidants, UV absorbers, antistats, and plasticizers.

In another aspect, the present invention is directed to a method for enhancing the effects of at least one agent selected from the group consisting of lubricants, heat stabilizers, UV absorbers, and pigments in admixture with rigid PVC comprising including in said mixture from about 0.1 to about 10 phr of an EPM copolymer.

DESCRIPTION OF THE PREFERRED EMBODIMENTS

As noted above, the present invention is directed to compositions comprising rigid PVC and from about 0.1 to about 10 phr, preferably about 2 to about 4 phr, of an EPM copolymer.

As employed herein, the term PVC is intended to include both homopolymers and copolymers of vinyl chloride, i.e., vinyl resins containing vinyl chloride units in their structure, e.g., copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

The term "PVC" as employed herein is also intended to include graft polymers of PVC with EVA, ABS, and MBS. Preferred substrates are also mixtures of the above-mentioned homopolymers and copolymers, in particular, vinyl chloride homopolymers, with other thermoplastic and/or elastomeric polymers, in particular, blends with ABS, MBS, NBR, SAN, EVA, CPE, MBAS, PMA, PMMA, EPDM, and polylactones.

Within the scope of this invention, PVC will also be understood to include recyclates of halogen-containing polymers, which are the polymers described above in more detail and which have suffered damage by processing, use or storage. PVC recyclate is particularly preferred. The recyclates may also contain minor amounts of foreign materials, typically paper, pigments, adhesives or other polymers, which are often difficult to remove. These foreign materials can also originate from contact with different substances during use or working up, for example, fuel residues, paint components, metal traces, initiator residues, and water traces.

It is preferred that the PVC be vinyl chloride homopolymer, i.e., polyvinyl chloride, per se.

As noted above, the compositions of the present invention also comprise one or more liquid ethylene-propylene copolymers (EPM), prepared using a tri-component ("modified" Ziegler type catalyst) system as described in U.S. Pat. No. 5,786,504. The compositions were used in rigid PVC formulations at less than 10 phr loadings.

The polymerization reaction described in U.S. Pat. No. 5,786,504 is characterized by being catalyzed by a catalyst composition comprising (a) a vanadium-containing compound; (b) an organo-aluminum compound; and (c) a catalyst promoter. Among the vanadium compounds that can be employed as the catalyst are vanadium oxytrichloride, vanadium tetrachloride, vanadium acetyl acetonate, vanadyl bis-diethylphosphate, chloro neopentyl vanadate, and the vanadium-containing catalysts described in U.S. Pat. No. 5,527,951.

In addition to the vanadium catalyst, the process utilizes an organo-aluminum compound as a co-catalyst. Preferably, the organo-aluminum compound is an alkyl aluminum or an alkyl aluminum halide. Of the halide compounds, the chlorides are most preferred. Among the preferred alkyl aluminum chlorides are ethyl aluminum sesquichloride, ethyl aluminum dichloride, diethyl aluminum chloride and diisobutyl aluminum chloride. Ethyl aluminum sesquichloride and diethyl aluminum chloride are most preferred.

A further additive used in the process of the present invention is a catalyst promoter that is a derivative of halo-but-3-enoic acids and esters. A specific description of such promoters is provided in U.S. Pat. No. 5,527,951, incorporated herein by reference in its entirety.

The polymerization process described in U.S. Pat. No. 5,527,951 is typically conducted in the following manner. The vanadium-containing compound (catalyst), the organoaluminum compound (co-catalyst), the catalyst promoter, reaction medium, and comonomers are introduced into a reaction vessel. The molar ratio of the catalyst promoter to the vanadium in the vanadium-containing compound is, preferably, in the range of from about 3:1 to about 80:1, more preferably, from 6:1 to 64:1, and most preferably, from about 12:1 to about 48:1.

The molar ratio of the co-catalyst to catalyst plus catalyst promoter is preferably in the range of from about 0.5:1 to about 500:1, more preferably, from 1.5:1 to 100:1, and, most preferably, from about 2.5:1 to about 10:1. The catalyst concentration can typically range from about $1 \times 10^{-8}$ to about $3 \times 10^{-1}$ mole of vanadium per liter of total reaction medium.

The reaction medium is an inert medium such as, e.g., pentane, hexane, heptane, octane, isooctane, decane, benzene, toluene, and the like, optionally, in combination with liquid alpha-olefins.

The polymerization reaction is typically conducted in the liquid state at a temperature in the range of from about −25° C. to about 70° C., for a time that can vary from several minutes or less to several hours or more depending on the specific reaction conditions and materials, typically, from about 15 minutes to about three hours.

In the preferred liquid EPM copolymers employed in the practice of the present invention, the ethylene to propylene (E/P) weight ratio is from about 85:15 to about 25:75, with the preferred ratios being 60:40 to 40:60; preferably the weight average molecular weights are from about 500 to about 200, 000, more preferably from about 20,000 to about 90,000, as determined by gas permeation chromatography (GPC).

Depending on their end use requirement, the compositions employed in the practice of the present invention can also contain further additives and stabilizers, including, inter alia, process aids, fusion promoters, plasticizers, lubricants, waxes, impact modifiers, fillers, reinforcing agents, antioxidants, light stabilizers, UV absorbers, blowing agents, fluorescent whitening agents, pigments, flame retardants, antistatic agents, gelling assistants, metal deactivators, scavenging compounds, modifiers and further sequestrants for Lewis acids, and the like, as is known in the art (see, for example, U.S. Pat. No. 6,531,533), the disclosure of which is incorporated herein by reference in its entirety. Preferred additives are selected from the group consisting of heat stabilizers, lubricants, impact modifiers, processing aids, antioxidants, fusion promoters, metal release agents, co-stabilizers, fillers, pigments, UV absorbers, antistats, and plasticizers.

Where fusion promoters, process aids, and lubricants are included in the compositions of the present invention, they can be, but are not limited to, for example, calcium stearate, montan wax, fatty acid esters, polyethylene waxes, chlorinated polyethylene, chlorinated hydrocarbons, oxidized polyethylene, methyl methacrylate-styrene-acrylonitrile resin, glycerol esters, combinations thereof, and the like. Where impact modifiers are included in the compositions of the present invention, they can be, but are not limited to, for example, chlorinated polyolefins such as chlorinated polyethylene, EVA copolymers, acrylic or modified acrylic resins, MBS copolymers, MABS copolymers, calcium carbonate, alumina trihydrate, and the like.

Preferred components of rigid PVC formulations include one or several additives selected from lubricants (such as calcium stearate, esters of organic acids, e.g., fatty acids, paraffin waxes), impact modifiers (such as polyacrylates, chlorinated polyethylene), process aids (such as ABS, SAN), fusion promoters (oxidized polyethylene), heat stabilizers (such as organotin stabilizers, e.g., organotin mercaptides or carboxylates, mixed metal stabilizers, lead stabilizers, heavy metal-free stabilizers), co-stabilizers (organic phosphite esters, epoxidized soybean oil, hydrotalcites, zeolites, perchlorates), fillers (such as titanium dioxide, calcium carbonate), pigments, antioxidants, UV absorbers (such as titanium dioxide), antistats, plasticizers, etc.

The PVC compositions of the present invention may be brought into a desired shape in a known manner. Examples of processes of this type are grinding, calendering, extruding, injection moulding and spinning, and extrusion blowmoulding. The PVC may also be processed to provide foams.

A PVC composition according to the invention is particularly suitable, for example, for hollow articles (bottles), packaging films (thermoformed films), blown films, pipes, foams, heavy profiles (window frames), translucent-wall profiles, construction profiles, sidings, fittings, office sheeting, and apparatus housings (computers, household devices).

It can also be used in rigid PVC foam moldings and PVC pipes, for example, for drinking water or wastewater, pressure pipes, gas pipes, cable-duct pipes and cable-protection pipes, pipes for industrial pipelines, drainpipes, outflow pipes, gutter pipes, and drainage pipes. For more detail in this connection, see Becker/H. Braun, Kunststoffhandbuch PVC, Vol. 2/2, W. (Carl Hanser Verlag, 2d ed. 1985), at 1236-77.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

Process for Making PVC Compounds

The EPM can be added either separately or as a "one-pack" in combination with other additives. They can be added to a PVC compound either before or during a processing step (compounding, extrusion, calendering, etc.). The formulation of PVC compounds and their processing are described in Handbook of PVC Formulating (Edward J. Wickson, ed., 1993); and Hans Zweifel, Plastics Additives Handbook (5th ed. 2001).

Materials

The control formulation contained PVC SE-950 from Shintech SE-950, titanium dioxide R-960 (for heat stability studies) and R-101 (for UV stability studies) from DuPont, an impact modifier, K-37, from Rohm & Haas, lubricants calcium stearate EDG (from Chemtura Corporation) and paraffin wax XL165P from Clariant Corporation, and a metal release agent, A-C 629A, from Honeywell.

The tested stabilizers included a blend of mono- and dimethyltin mercaptides (Mark 1900), a butyltin carboxylate (Mark T-634), a mixed metal (Ca/Zn) stabilizer (TS-1269), and heavy metal-free stabilizer Mark OBS-130 from Chemtura Corporation.

Trilene CP-80 manufactured by Chemtura Corporation was used as an EPM additive (ethylene/propylene ratio 41/59, molecular weight about 80,000 by GPC).

Evaluation of Heat Stability

Rigid PVC compounds were prepared using standard formulations and the EPM additive. Each PVC compound test sample was placed into a Brabender mixer operated at 190° C. and 65 RPM. Sample chips were taken every three minutes. Fusion torque, fusion time, and the decomposition time were automatically recorded.

Heat stability was determined from sample chips using a Hunter Lab colorimeter (ASTM D-1925) measuring Yellowness Index (YI) (lower YI signifies reduced discoloration as a result of thermal decomposition and, therefore, superior thermal stabilization).

The results in Tables 1-8 illustrate the effect of the EPM on heat stability as measured as Yellowness Index and decomposition time of rigid PVC compounds. The data show that added at 1-3 phr, the EPM significantly reduced yellowness index and increased the decomposition time of PVC compounds that were stabilized by either type of the stabilizers.

TABLE 1

EFFECT OF THE EPM ON YELLOWNESS INDEX OF PVC STABILIZED BY MARK 1900

| Heat Exposure Time, min. | EPM, phr | | | |
|---|---|---|---|---|
| | 0 | 1 | 2 | 3 |
| | Yellowness Index | | | |
| 3 | 4.27 | 4.91 | 5.27 | 5.48 |
| 6 | 7.03 | 6.73 | 7.18 | 7.46 |
| 9 | 10.31 | 8.68 | 9.29 | 9.03 |
| 12 | 14.33 | 11.76 | 11.45 | 11.15 |
| 15 | 22.36 | 16.03 | 14.64 | 14.34 |
| 18 | 34.64 | 27.74 | 20.79 | 19.55 |

TABLE 2

EFFECT OF EPM ON THE DECOMPOSITION TIME OF PVC STABILIZED BY MARK 1900

| | EPM, phr | | | |
|---|---|---|---|---|
| | 0 | 1 | 2 | 3 |
| Decomposition time, min.:sec. | 20:12 | 21:48 | 24:28 | 25:00 |

TABLE 3

EFFECT OF EPM ON YELLOWNESS INDEX OF PVC STABILIZED BY TS-1269

| | EPM, phr | | | |
|---|---|---|---|---|
| Heat Exposure Time, min. | 0 | 1 | 2 | 3 |
| | Yellowness Index | | | |
| 3 | 5.46 | 5.52 | 5.24 | 5.56 |
| 6 | 6.93 | 6.83 | 6.74 | 6.97 |
| 9 | 9.34 | 7.87 | 8.06 | 8.56 |
| 12 | 17.75 | 10.69 | 10.42 | 10.95 |
| 15 | 28.47 | 19.71 | 17.58 | 16.98 |
| 18 | 39.3 | 28.6 | 24.48 | 25.59 |
| 21 | 42.59 | 36.8 | 27.87 | 27.6 |
| 24 | 45.49 | 40.1 | 33.76 | 29.92 |
| 27 | | 43.72 | 37.33 | 34.07 |
| 30 | | | 37.97 | 39.27 |

TABLE 4

EFFECT OF EPM ON THE DECOMPOSITION TIME OF PVC STABILIZED BY TS-1269

| | EPM, phr | | | |
|---|---|---|---|---|
| | 0 | 1 | 2 | 3 |
| Decomposition time, min.:sec. | 22:56 | 26:00 | 29:44 | 32:48 |

TABLE 5

EFFECT OF EPM ON YELLOWNESS INDEX OF PVC STABILIZED BY MARK T-634

| | EPM, phr | | | |
|---|---|---|---|---|
| Heat Exposure Time, min. | 0 | 1 | 2 | 3 |
| | Yellowness Index | | | |
| 6 | 4.34 | 4.62 | 4.47 | 4.42 |
| 9 | 4.99 | 5.55 | 5.98 | 5.54 |
| 12 | 6.48 | 7.16 | 7.05 | 7.22 |
| 15 | 8.85 | 9.62 | 9.09 | 9.28 |
| 18 | 12.47 | 12.67 | 11.73 | 11.71 |
| 21 | 16.54 | 16.76 | 15.21 | 15.21 |
| 24 | 22.27 | 20.92 | 18.92 | 18.85 |
| 27 | 29.68 | 27.00 | 24.00 | 23.45 |
| 30 | 36.44 | 34.59 | 30.10 | 29.07 |
| 33 | 41.82 | 42.15 | 37.31 | 35.36 |
| 36 | | 44.88 | 43.11 | 41.21 |
| 39 | | | 43.62 | 43.13 |

TABLE 6

EFFECT OF EPM ON THE DECOMPOSITION TIME OF PVC STABILIZED BY MARK T-634

| | EPM, phr | | | |
|---|---|---|---|---|
| | 0 | 1 | 2 | 3 |
| Decomposition time, min.:sec. | 34:40 | 38:12 | 41:16 | 43:44 |

TABLE 7

EFFECT OF EPM ON YELLOWNESS INDEX OF PVC STABILIZED BY MARK OBS 130

| | EPM, phr | | | |
|---|---|---|---|---|
| Heat Exposure Time, min. | 0 | 1 | 2 | 3 |
| | Yellowness Index | | | |
| 3 | 5.56 | 4.42 | 5.05 | 5.85 |
| 6 | 12.53 | 11.42 | 11.95 | 12.42 |
| 9 | 31.70 | 32.04 | 28.39 | 26.25 |
| 12 | 55.79 | 52.34 | 45.17 | 42.71 |
| 15 | | | 55.68 | 54.97 |

TABLE 8

EFFECT OF THE EPM ON THE DECOMPOSITION TIME OF PVC STABILIZED BY MARK OBS 130

| | EPM, phr | | | |
|---|---|---|---|---|
| | 0 | 1 | 2 | 3 |
| Decomposition time, min.:sec. | 14:36 | 14:48 | 17:44 | 20:48 |

Static heat stability experiments were carried out to demonstrate a synergistic effect between the EPM and conventional stabilizers, such as Mark 1900. Several 1"×1" chips were cut from milled sheets, placed on aluminum foil strips (one strip for one sheet that represents a certain PVC formulation) and put into an oven at 360° F. (182° C.). The chips were removed from the oven at 15 minute intervals and affixed to a lab chart. The maximum time is either about 1½ hours or until complete degradation occurs. The results shown in Table 9 demonstrate that a PVC compound that contained both Mark 1900 and EPM was of surprisingly superior static heat stability than could have been expected based on the heat stabilities of the PVC compounds stabilized by those two components used individually.

TABLE 9

SYNERGISTIC EFFECT BETWEEN EPM AND MARK 1900 IN STABILIZING PVC AGAINST THERMAL DEGRADATION

| | Stabilizer Systems | | |
|---|---|---|---|
| Heat Exposure Time, min. | Mark 1900 (1.2 phr) | EPM (2.0 phr) | Mark 1900 (1.2 phr) and EPM (2.0 phr) |
| | Yellowness Index | | |
| 15 | 34.12 | 66.75 | 32.7 |
| 30 | 35.75 | | 32.83 |
| 45 | 48.48 | | 39.34 |
| 60 | 53.88 | | 39.14 |
| 75 | 88.55 | | 52.97 |
| 90 | | | 73.21 |

Evaluation of UV Stability/Weatherability

The QUV accelerated Weathering Tester was used to simulate the damage caused by the forces of the weather (heat, humidity, and sunlight) in an outdoor environment. The QUV lamps are efficient generators of ultraviolet light similar to that in sunlight. A UV-A-340 lamp was used to simulate sunlight in the short wavelength of the UV region. PVC samples were mounted on standard panel holders (3"×12"), secured by snap-in rings and placed into the QUV Tester.

The cycle time was UV exposure for four hours at 60° C. followed by a condensation period (the UV source was off) for four hours at 50° C. and 100 percent humidity. At every 250-hour interval a 1"×1" piece was cut from each sample and mounted on a demonstration chart to show the effects of the exposure. The color of the pieces was measured as Yellowness Index using the Hunter Lab calorimeter (ASTM D-1925).

The sample holders were rotated within the tester chamber every 250 hours.

PVC compounds containing ten phr titanium dioxide, a commonly used UV stabilizer, and EPM loaded at five phr were tested for UV stability against a control that contained no EPM. The data in Table 10 show that the EPM significantly enhanced UV stability of the standard PVC compound, especially during the first 1,500 hrs.

TABLE 10

EFFECT OF EPM ON UV STABILITY OF RIGID PVC COMPOUND
(STABILIZED WITH MARK 1900) CONTAINING 10 PHR TiO$_2$

| | Yellowness Index | |
|---|---|---|
| Time of Exposure, hrs | Standard PVC compound (control) | Standard PVC compound in the presence of the EPM (5 phr) |
| 0 | 6.43 | 5.63 |
| 500 | 14.59 | 8.3 |
| 1000 | 20.94 | 13.52 |
| 1500 | 23.8 | 14.96 |
| 2000 | 21.07 | 16.18 |
| 2500 | 17.98 | 16.74 |

Evaluation of Lubricity

The effect of an additive on the lubricity of PVC formulations is commonly gauged based on the fusion time and fusion torque, where reduced fusion time and reduced fusion torque indicate improvement in lubricity of the formulation. Improved lubrication was observed for the PVC formulations containing the EPM (Tables 11-12).

TABLE 11

EFFECT OF EPM ON THE FUSION TIME OF PVC COMPOUNDS

| | EPM, phr | |
|---|---|---|
| | 0 | 3 |
| Heat stabilizers | Fusion Time, min.:sec. | |
| Mark 1900 | 1:00 | 0:48 |
| Mark T-634 | 5:44 | 1:52 |
| Mark OBS-130 | 200 | 0:36 |

TABLE 12

EFFECT OF EPM ON FUSION TORQUE OF PVC COMPOUNDS

| | EPM, phr | |
|---|---|---|
| | 0 | 3 |
| Heat stabilizers | Fusion Torque, meter × grams | |
| Mark 1900 | 3396 | 2895 |
| Mark T-634 | 2171 | 1969 |
| TS-1269 | 3508 | 2763 |

Evaluation of Gloss

The gloss of flat, plane surfaces was measured by the reflectance of light off the surface at an incidence angle of 60° using a Gardner BYK Micro gloss meter (ASTM D523). The experimental data show that the EPM functions as an effective gloss reducing agent in rigid PVC compounds (Table 13).

TABLE 13

EFFECT OF EPM ON GLOSS OF RIGID PVC

| | Gloss | | |
|---|---|---|---|
| EPM, phr | PVC stabilized by Mark 1900 | PVC stabilized by Mark T-634 | PVC stabilized by TS-1269 |
| 0 | 97 | 86 | 97 |
| 2 | 84 | 77 | 77 |
| 3 | 73 | 58 | 65 |

In view of the many changes and modifications that can be made without departing from principles underlying the invention, reference should be made to the appended claims for an understanding of the scope of the protection to be afforded by the invention.

What is claimed is:

1. A composition comprising
   rigid PVC;
   at least one heat stabilizer selected from the group consisting of organotin mercaptides, organotin carboxylates, mixed metal stabilizers, lead stabilizers, and heavy metal-free stabilizers; and
   from about 0.1 to about 10 phr of a liquid ethylene/propylene (EPM) copolymer.

2. The composition of claim 1 wherein the ethylene to propylene ratio in the liquid EPM copolymer is in the range of from about 85:15 to about 25:75 and the molecular weight is in the range of from about 500 to about 200,000 as determined by GPC.

3. The composition of claim 1 further comprising at least one additive selected from the group consisting of lubricants, impact modifiers, process aids, fusion promoters, co-stabilizers, fillers, pigments, antioxidants, UV absorbers, antistats, metal release agents, and plasticizers.

4. The composition of claim 3 wherein at least one lubricant selected from the group consisting of paraffin waxes, esters of organic acids, and calcium stearate is present.

5. The composition of claim 3 wherein at least one UV absorber is present.

6. The composition of claim 5 wherein the UV absorber is titanium dioxide.

7. The composition of claim 3 wherein at least one pigment is present.

8. A method for reducing gloss in rigid PVC comprising:

providing an admixture of PVC and at least one heat stabilizer selected from the group consisting of organotin mercaptides, organotin carboxylates, mixed metal stabilizers, lead stabilizers, and heavy metal-free stabilizers;

adding to said admixture from about 0.1 about 10 phr of a liquid ethylene/propylene (EPM) copolymer.

* * * * *